Oct. 28, 1969    J. A. SCHEINEMAN    3,474,829
NON-LINEAR OPERATING LINKAGE FOR
A RATE-OF-FLOW CONTROL VALVE
Filed May 15, 1967    2 Sheets-Sheet 1

INVENTOR:
JOHN A. SCHEINEMAN
BY: *Louis J. Bovasso*
HIS ATTORNEY

Oct. 28, 1969 J. A. SCHEINEMAN 3,474,829
NON-LINEAR OPERATING LINKAGE FOR
A RATE-OF-FLOW CONTROL VALVE
Filed May 15, 1967 2 Sheets-Sheet 2

INVENTOR:
JOHN A. SCHEINEMAN
BY: *Louis J. Bovasso*
HIS ATTORNEY

United States Patent Office 3,474,829
Patented Oct. 28, 1969

3,474,829
NON-LINEAR OPERATING LINKAGE FOR A
RATE-OF-FLOW CONTROL VALVE
John A. Scheineman, Houston, Tex., assignor to Shell
Oil Company, New York, N.Y., a corporation of
Delaware
Filed May 15, 1967, Ser. No. 638,369
Int. Cl. F16k 5/06, 31/163
U.S. Cl. 137—625.32                    2 Claims

ABSTRACT OF THE DISCLOSURE

A toggle-type operating linkage to improve the performance of a rotating flow control valve. A prime mover is pivotally mounted in one position and has an extensible arm attached thereto. Two links are pivotally mounted to the extensible arm, the free end of one link being pivotally mounted to a fixed anchor point and the free end of the other link being pivotally mounted to the operating arm of a rotating flow control valve. This toggle-type linkage provides increasing torque capability on the valve stem and decreasing valve flow sensitivity as the extensible arm moves out linearly, thereby rotating the valve in the closing direction.

BACKGROUND OF THE INVENTION

Field of the invention

The invention relates to an improved actuator device for a rotating-type flow control valve and, more particularly, to a non-linear scissors or toggle-type operating linkage for a rotary flow control valve for improving the valve performance.

Description of the prior art

Two-way valves generally fall in one of two major categories depending on their intended function. The first category includes shutoff or flow-blocking valves, and the second category covers flow-control valves which modulate the rate of flow. Shutoff or flow-blocking valves are designed to be either completely open, thus allowing unrestricted flow of fluid through the valve, or completely closed, thus preventing any flow of fluid through the valve. Valves in the second category are designed to control the rate of fluid flow through the valve over a rather wide range of capacity. These valves function by presenting varying degrees of restriction (i.e., by reducing the area) to the flowing stream as the valve is stroked between its extreme positions. Rate of flow control valves characteristically operate much of the time at various intermediate positions. It is possible for a single valve to perform both of these functions, but the requirements for the two categories are not completely compatible. Good shutoff valves are generally poor rate of flow control valves and vice versa. For example, rate of flow control valves generally cannot provide absolutely tight shutoff; in their fully closed position there may be a certain amount of unavoidable leakage.

The use of butterfly and ball valves for flow control is becoming increasingly popular. The flow coefficient ($C_V$) for a ball valve throughout most of its rotation (i.e., "stroke") almost parallels the popular "equal percentage" characteristic. In addition to this generally desirable $C_V$ characteristic, the ball valve provides a much greater wide open $C_V$ for any given valve body size than is possible with a conventional control valve. $C_V$ is defined as the gallons per minute (g.p.m.) of water which will flow through the valve at a one p.s.i. pressure drop. Its relationship to other variables is as follows:

$$Q = C_V \sqrt{\frac{\Delta P}{\text{specific gravity}}}$$

where: Q is water flow in g.p.m. and $\Delta P$ is the pressure drop in p.s.i.

When used to throttle flow, ball, butterfly and other rotary type valves can develop rather large unbalanced torques in the closing direction increasing with pressure drop across the valve. Friction may also be significantly greater than for conventional control valves. Most existing rotary type valve operators are designed basically for two-position open-close service, and these operators are not well suited for modulating flow rate control valves. These disadvantages can be overcome through use of more powerful pneumatic and hydraulic operators which have only recently become available. These new more powerful valve operators utilize high pressure double acting pistons to overcome friction and hydrodynamic torque with brute force.

At most electric motor-driven centrifugal pump booster stations a low initial wide open pressure drop through the control valve is highly desirable, but this initial condition is not compatible with good control when throttling is required. In effect, the control valve is oversized, with very low sensitivity in the wide open range, but extreme sensitivity when throttling at high differential pressure drop. Unfortunately, the flow dynamics of most pumping processes are such that the pressure drop across the control valve increases significantly as flow is reduced. Thus, changes in flow are not at all proportional to changes in valve stem position.

The best linkage for a flow rate control valve is one that will provide minimum change in sensitivity (i.e., "gain") throughout the valve rotation (i.e., "stroke"). This requires a linkage producing a large initial change in $C_V$ for a given increment of piston stroke when the valve first begins to close from the wide open position, and increasingly smaller reductions in $C_V$ for each additional increment of piston stroke as the valve continues closing. For many applications this non-linear change in $C_V$ (with respect to stroke) should be much greater than is available with the popular equal percentage control valve.

The "sensitivity" of any rate of flow control valve at any position can be defined as the percent change in flow (or pressure) produced by a one percent change in actuator (piston) stroke. Ideally, the unit sensitivity should be constant over the full range of flow and actuator position. If this were possible, any conventional closed feedback control loop would provide optimum response over the full range of flow (or pressure) required because the other links in the control loop normally have fixed sensitivities. In actual practice, the control valve (and its actuator) is usually the one major link in a control loop having non-linear sensitivity. Sensitivity changes with valve position. Because of this variation in sensitivity, the control loop must generally be tuned at its most sensitive position (i.e., generally at low flows and high pressure drops). At other operating conditions where the control valve sensitivity is less, the control loop is likely to be over-damped and sluggish in its response.

SUMMARY OF THE INVENTION

It is an object of this invention to offset large changes in valve-flow sensitivity with respect to control loop gain when changing from full-open to heavily-throttled positions utilizing rotating-type flow control valves. This is accomplished by providing a non-linear scissors or toggle-type operating linkage for controlling the rotating-type rate of flow control valve, such as the ball, or butterfly type as used in the pipeline, oil refining and chemical process industries. A prime mover, such as a hydraulic cylinder having an extensible piston rod, is pivotally mounted to a fixed support. The free end of the extensible rod is pivotally mounted to a pair of links. The free end of one of the links is pivotally mounted to a fixed support; the free end of the other link is pivotally mounted to a valve-operating arm. The valve-operating arm is fixed to the stem of a rotating flow control valve. The pair of links thus form a scissors or toggle-type linkage. As the piston rod moves linearly, the toggle linkage causes the valve operating arm to move non-linearly, thus providing increasingly greater torque capability on the valve stem as the valve rotates towards the closed position.

It is a further object of the invention to allow large size flow control valves having lower initial pressure drop to provide satisfactory performance on many applications.

Other objects and advantages of this invention will become apparent to those skilled in the art as the description thereof proceeds.

DESCRIPTION OF THE PREFERRED EMBODIMENT

Figure 1:
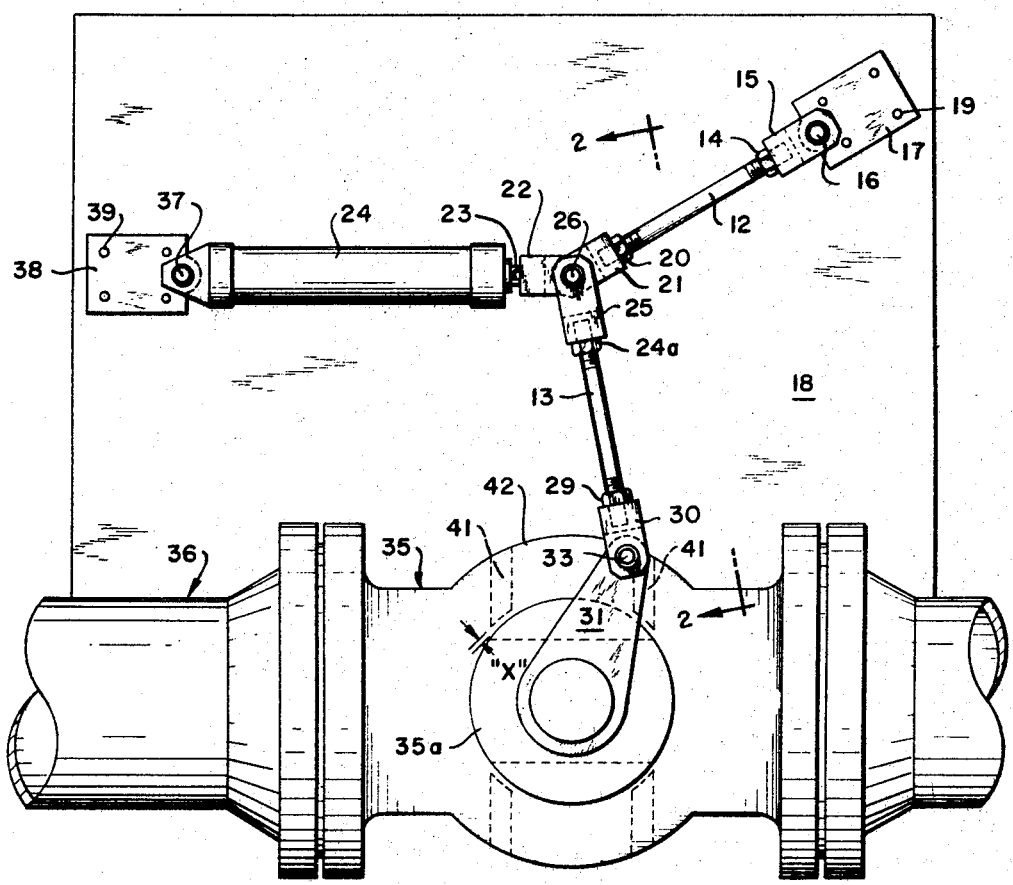
FIGURE 1 is a vertical view (elevation), partly diagrammatic, of a preferred embodiment of the invention.
Figure 2:
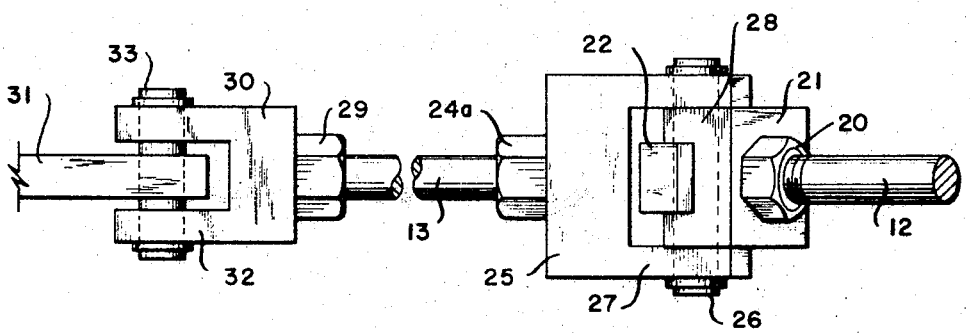
FIGURE 2 is a view taken along line 2—2 of FIGURE 1.

Turning to the drawing, FIGURE 1 shows a scissors or toggle-type linkage 11 having a pair of links 12 and 13. Link 12 is fixed at nut 14 to a clevis 15 which is pivotally mounted at pin 16 to a fixed bracket 17. Bracket 17 is fastened to a mounting plate 18 through conventional fastening means, such as screws 19. The other end of link 12 is fixed at nut 20 to a small clevis 21 as can be seen in detail on FIGURE 2. Clevis 21 is pivotally attached to a rod eye 22 fixed to extensible piston rod 23 which is mounted in hydraulic cylinder 24. Link 13 is fixed at nut 24a to a larger clevis 25. A pivot pin 26 passes through eye holes in clevises 25 and 21 as can be seen in FIGURE 2, thereby permitting the larger clevis 25 (and attached link 13) to pivot with respect to smaller clevis 21 (and link 12). Pin 26 is retained in place by conventional means. Smaller clevis 21 is mounted between the legs 27 of larger clevis 25 as can be best seen in FIGURE 2. As can also been seen in FIGURE 2, rod eye 22 is disposed between the legs 28 of smaller clevis 21 and thus is also mounted between the legs 27 of clevis 25. Pin 26 passes through rod eye 22, permitting rod eye 22 (and fixed piston rod 23) to also pivot about pin 26. The free end of link 13 is fixed at nut 29 to clevis 30. A valve-operating arm 31 is disposed between the legs 32 of clevis 30. A pivot pin 33 passes through eye holes of clevis 32 and arm 31 in order to pivotally fasten valve-operating arm 31 to clevis 30. Pivot pin 33 is retained in place by conventional means. Valve operating arm 31 is fixed to the stem and ball 35a of a conventional ball flow control valve assembly 35 in pipeline system 36. Extensible piston rod 23 is slidable in hydraulic cylinder 24 as is well known in the art. The blind end of cylinder 24 is pivotally mounted by means of pivot pin 37 to an anchor bracket 38 fixed to plate 18 through conventional means, such as screws 39.

Figure 3:
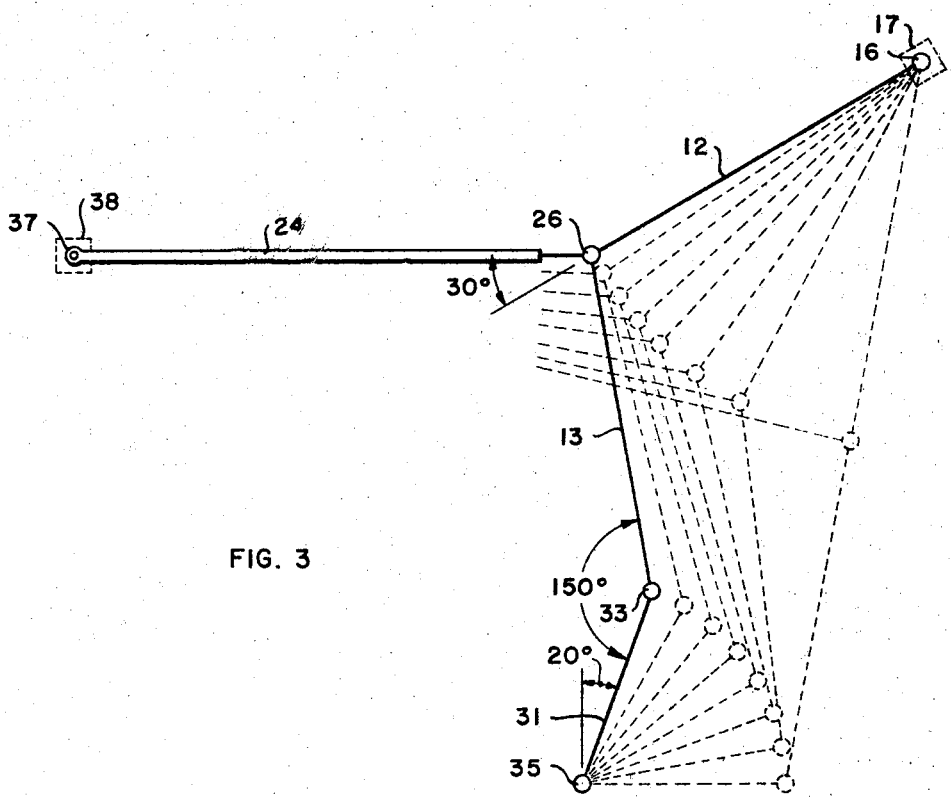
FIGURE 3 illustrates schematically the relationship between changes in position of the linkage arms and the valve-operating arm for one specific arrangement of the apparatus shown in FIGURE 1.

As depicted, the apparatus of FIGURE 1 is in a fully retracted position with the ball flow control valve wide open. As the extensible piston rod 23 starts to move to the right on FIGURE 1, the rod eye will extend to the right and the pivotally mounted links 12 and 13 will begin to straighten out. The valve-operating arm, pivotally connected to arm 13, will rotate to a substantially horizontal position in order to close the ball flow control valve. This is shown schematically in FIGURE 3. The solid lines show the ball flow control valve in a fully open position. In this position, valve operating arm 31 is disposed approximately 20° from the vertical, linkage arm 12 is disposed approximately 30° from the horizontal, and linkage arm 13 disposed approximately 150° from valve operating arm 31. It can thus be seen from FIGURE 3 as the pivot pin 26 moves downwardly and to the right, pivot pin 33 moves downwardly in an arc towards a final substantially horizontal position. The valve in this final position has been rotated approximately 70° from the fully open position. As is well known in the art, for any given length of links 12, 13 and arm 31, the degree of total rotation can be fixed by properly positioning the pivot pins (16, 37) with anchor brackets (17, 38).

Figure 4:
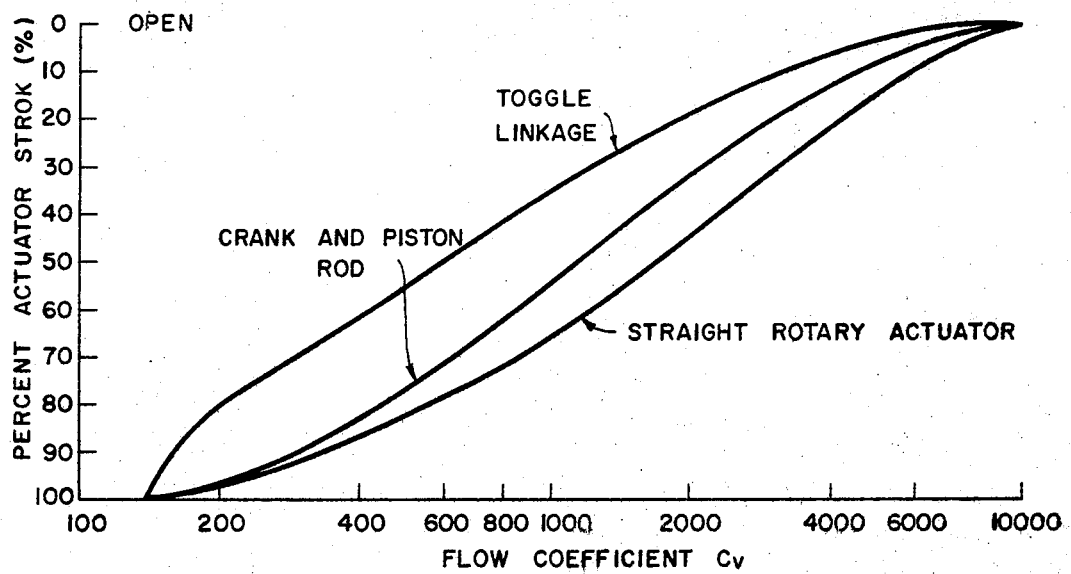
FIGURE 4 illustrates graphically the relationship between actuator stroke and flow coefficient $C_v$ for various types of operating linkages used on a typical ball flow control valve.

FIGURE 4 illustrates graphically the characteristic of the scissors or toggle-type linkage of the instant invention as compared to a conventional straight rotary actuator (such as a rack and pinion, or a rotary vane operator arrangement) where the valve stem rotation is directly proportional to piston stroke, and the common crank and piston rod arrangement.

The advantages of the scissors or toggle-type linkage can be seen from the following example. Assume a 22″ diameter pipeline operating at a flow rate of 300,000 barrels per day (b./d.) equal to 8,750 gallons per minute (g.p.m.) and 8 feet per second (f.p.s.). The control valve is a 16″ ball valve having a wide open $C_v$ of approximately 10,000. With the valve wide open, the pressure drop across the valve is less than one pound per square inch (p.s.i.). The pipeline surge factor is 40 p.s.i./f.p.s. This is the pressure change required to cause a flow change of one f.p.s. It is desired to reduce flow rate quickly to 250,000 b./d. (7,300 g.p.m., 6.6 f.p.s.). Since the desired reduction in velocity is approximately 1.4 f.p.s., the station discharge pressure will have to be reduced 1.4 times 40 or 56 p.s.i. To satisfy the laws of continuity, the station suction pressure will have to be increased by this same amount. The control valve must bite off this pressure, amounting to a 112 p.s.i. drop across the valve. In addition to this 112 p.s.i. bite, recovered friction and centrifugal pump head rise will amount to another 47 p.s.i., which the valve must throttle off. The total pressure drop across the control valve to reduce the flow to the desired condition (250,000 b./d.) must be 159 p.s.i.

The pressure drop will require the valve to move to a $C_v$ of approximately 525. With the scissors or toggle-type linkage, this will require an actuator stroke of 53% (see FIGURE 4). Using the crank and connecting rod, actuator stroke would be 75%; with the straight rotary operator, actuator stroke would be 81%. In addition to the reduced actuator stroke required, the toggle linkage at the new operating point has a more favorable slope (sensitivity), i.e., less change in $C_v$ per increment of stroke. The increased sensitivity of the other arrangements would require a wider proportional band (i.e., a lower gain setting) on the controller. This lower gain will cause these actuators to be less responsive, and yet they are required to move a considerably greater percentage of total stroke.

Another advantage of the scissors or toggle-type linkage derives from the torque characteristic of the valve. As the valve rotates towards the closed position and pressure drop increases, the hydrodynamic torque acting on the valve will increase. The maximum valve torque occurs at approximately the 60° to 70° closed position. The toggle linkage provides increasingly greater operator torque capacity as the valve rotates toward the closed position, thus tending to match the torque available with the torque required.

The following tabular listing illustrates the non-linearity of the scissors or toggle-type linkage of the invention. The piston rod force for a constant valve operating torque of 1,000 inch-pounds is shown for three valve operating arm lengths (arm 31 in FIGURE 1). The percent actuator stroke and degrees of rotation of the valve are also listed.

| Valve Position [1], degrees: | Piston Rod Force, pounds | Percent Actuator Stroke |
|---|---|---|
| 12" Valve Operating Arm | | |
| 0 | 320 | 0.0 |
| 10 | 180 | 4.2 |
| 20 | 138 | 10.5 |
| 30 | 105 | 18.6 |
| 40 | 87 | 28.6 |
| 50 | 70 | 42.5 |
| 60 | 47 | 58.4 |
| 70 | 0 | 100.0 |
| 10" Valve Operating Arm | | |
| 0 | 419 | 0.0 |
| 10 | 235 | 4.3 |
| 20 | 170 | 10.6 |
| 30 | 130 | 19.5 |
| 40 | 108 | 30.7 |
| 50 | 900 | 44.1 |
| 60 | 900 | 62.4 |
| 70 | 0 | 100.0 |
| 8" Valve Operating Arm | | |
| 0 | 489 | 0.0 |
| 10 | 312 | 3.8 |
| 20 | 216 | 10.2 |
| 30 | 166 | 18.3 |
| 40 | 132 | 28.7 |
| 50 | 102 | 41.5 |
| 60 | 75 | 58.4 |
| 70 | 0 | 100.0 |

[1] Degrees from fully open position (0° is fully open).

To reduce ball valve frictional forces which must be overcome by the valve operator, special clearance rings can be located so as not to ride on or touch the ball. This is shown in FIGURE 1 where the rings 41 are shown welded or otherwise fastened to the valve body 42 of assembly 35. The distance $x$ between rings 41 and the ball 35a is approximately 1/16 inch. To further improve the valve performance, the operating linkage can be arranged to provide a maximum of only 75° of ball rotation or less. Most ball valves require 90° stem rotation for full stroke, and the last 10° of rotation (i.e., closing) is taken up by ball-seat overlap. In the open position, the ball port would normally be fully aligned with the valve body.

These features may further enhance the dynamic performance of the apparatus of FIGURE 1 as a flow control valve. This enhancement can be realized partly in reduction of actuator size and force required, and partly in additional non-linear characterization of the valve flow coefficient with respect to actuator stroke. These features would normally be incorporated in rotary type flow control valves used at most pipeline booster stations. Any amount of stem rotation desired, from approximately 60° up to 90°, can be readily obtained on any given valve by relocating anchor brackets 17 and 38, with pins 16 and 37 (FIGURE 1). It would be possible to do this automatically by use of suitable controller and power positioning elements, or through use of a manually operated "quick-change" mechanism. This stroke adjustment feature might be advantageous in certain applications to extend, in the decreasing direction only, the flow rate over which the valve can provide satisfactory control.

Certain other variations may be made in the disclosed apparatus without departing from the teachings of the invention. For example, the piston operator can be a hydraulic cylinder as disclosed, or any type of prime mover, such as a pneumatic cylinder or diaphragm-type acuator. The linkage arms 12 and 13 need not necessarily be of the same length and the operation can be reversed whereby the valve is closed when the piston rod is in a fully retracted position. The initial angles of the linkages can be varied. Although a ball control valve has been shown in a preferred embodiment, the device is adaptable to be used to control any rotary flow control valve, such as a butterfly or plug cock-type flow control valve.

The scissors or toggle linkage on a rotary valve provides dynamic response superior to existing air diaphragm operated, equal percentage, V port, double seat control valves. Significant hydraulic horsepower savings can be realized since, in an application of the teachings of this invention, the wide-open valve pressure drop for a ball flow control valve was found to be approximately .1 p.s.i. as compared with approximately 15 p.s.i. for the conventional control valve it replaced. In spite of this "oversized" characteristic (from the control standpoint), sensitivity of the control system to flow or pressure changes was found to be relatively constant over the full range of operator stroke. The hydraulic piston force was found to be relatively constant through its full stroke while the valve stem torque increased greatly as the valve rotated towards the closed position to reduce flow.

I claim as my invention:

1. A rate-of-flow control device for modulating the rate of flow of fluids through a pipeline wherein the rate of flow of fluids through said pipeline is controlled by rotating a rate-of-flow control valve means comprising:
   non-seating rotary rate-of-flow control valve means cooperating with said pipeline for modulating the rate of flow of fluids within said pipeline;
   said rotating flow control valve means including a rotatable ball valve assembly operatively engaging said pipeline and adapted to be contacted by fluids flowing within the pipeline;
   said ball valve assembly including a valve body, a ball mounted in said valve body and non-moving clearance rings within said assembly fastened to the valve body and spaced from (not sliding on or touching) the ball of the valve assembly, for eliminating frictional forces between the ball and the clearance rings;
   selectively retractable prime mover means operatively engaging said valve means;
   non-linear operating linkage means coupled between said prime mover means and said valve means and adapted to provide a specially characterized relationship which reduces changes in valve-flow gain between the valve position and the actuator stroke throughout the full range of stroke of said linkage means;

said prime mover means being pivotally mounted and having an extensible arm, first and second linkage arms coupled to said prime mover means, the first arm pivotally mounted to a fixed support at one end and pivotally mounted to the extensible arm of said prime mover means at its other end, and the second arm pivotally mounted to the extensible arm of said prime mover means at one end and pivotally mounted to the control valve means at its other end; and said prime mover means being in its retractable position when said valve means is in its open position.

2. The device of claim 1 wherein the non-moving clearance rings are spaced approximately one-sixteenth of an inch from the ball of the valve assembly.

References Cited

UNITED STATES PATENTS

| | | | |
|---|---|---|---|
| 712,350 | 1902 | Williamson | 251—159 |
| 2,292,873 | 8/1942 | Finegan | 251—159 X |
| 3,007,490 | 11/1961 | Passmore | 251—159 X |
| 3,204,920 | 9/1965 | Generke | 251—58 |
| 3,317,179 | 5/1967 | Willis | 251—58 |

FOREIGN PATENTS 1,111,732  11/1955  France.

ARNOLD ROSENTHAL, Primary Examiner

U.S. Cl. X.R.

251—58, 232, 280